United States Patent
Hurlbert et al.

(10) Patent No.: US 7,806,413 B2
(45) Date of Patent: Oct. 5, 2010

(54) STATIC GASKET

(75) Inventors: David Hurlbert, Ypsilanti, MI (US); Thomas Hemmrich, Bloomfield Hills, MI (US)

(73) Assignee: Federal-Mogul Corporation, Southfield, MI (US)

( * ) Notice: Subject to any disclaimer, the term of this patent is extended or adjusted under 35 U.S.C. 154(b) by 425 days.

(21) Appl. No.: 11/936,409

(22) Filed: Nov. 7, 2007

(65) Prior Publication Data

US 2009/0066035 A1    Mar. 12, 2009

Related U.S. Application Data

(60) Provisional application No. 60/864,843, filed on Nov. 8, 2006.

(51) Int. Cl.
F16J 15/12    (2006.01)

(52) U.S. Cl. .................... 277/592; 277/594

(58) Field of Classification Search .......... 277/591, 277/592, 594, 596, 652, 654

See application file for complete search history.

(56) References Cited

U.S. PATENT DOCUMENTS

| | | | |
|---|---|---|---|
| 3,957,279 A | 5/1976 | Belter | |
| 4,630,835 A | 12/1986 | Locacius | |
| 4,743,421 A | 5/1988 | McDowell et al. | |
| 4,846,482 A | 7/1989 | Blodgett et al. | |
| 5,393,076 A | 2/1995 | Hagiwara et al. | |
| 5,582,415 A | 12/1996 | Yoshida et al. | |
| 5,769,430 A | 6/1998 | Udagawa | |
| 5,785,322 A | 7/1998 | Suggs et al. | |
| 5,938,208 A | 8/1999 | Yoshida et al. | |
| 6,062,572 A | 5/2000 | Hasegawa et al. | |
| 6,089,572 A * | 7/2000 | Plunkett | 277/592 |
| 6,092,810 A * | 7/2000 | Plunkett | 277/593 |
| 6,318,733 B1 | 11/2001 | Udagawa | |
| 6,457,726 B1 | 10/2002 | Jung | |
| 6,478,307 B2 | 11/2002 | Sugimoto et al. | |
| 6,533,287 B1 * | 3/2003 | Belter | 277/598 |
| 6,550,782 B2 | 4/2003 | Okazaki | |
| 6,585,272 B2 | 7/2003 | Inamura | |
| 6,588,765 B2 | 7/2003 | Hiramatsu et al. | |
| 6,682,080 B2 | 1/2004 | Miyaoh | |
| 6,893,023 B2 | 5/2005 | Kato | |
| 7,011,313 B2 | 3/2006 | Ueta et al. | |

(Continued)

FOREIGN PATENT DOCUMENTS

JP    04248070 A *    9/1992

(Continued)

Primary Examiner—Vishal Patel
(74) Attorney, Agent, or Firm—Robert L. Stearns; Dickinson Wright, PLLC

(57) ABSTRACT

A static gasket (26) for use in sealing a clamped joint, such as an intake manifold (16) for an internal combustion V engine (10). The gasket (26) includes a metal core 28 having an embossment (40) formed therein. A layer of elastomeric sealing material (38) is applied to at least the embossment (40) on both sides of the core (28). A crown bead (46) is formed along the convex crest portion (44) of the embossment (40), whereas a pair of flanking beads (48) extend along either side of the embossment (40) adjacent its concave side. The gasket (26) is particularly adapted for sealing joints having inconsistently misaligned gaps at the sealing interface.

16 Claims, 4 Drawing Sheets

U.S. PATENT DOCUMENTS

| | | |
|---|---|---|
| 7,073,795 B2 | 7/2006 | Ueta et al. |
| 2002/0017763 A1 | 2/2002 | Udagawa et al. |
| 2002/0163139 A1 * | 11/2002 | Poquet et al. ............... 277/592 |
| 2004/0130102 A1 | 7/2004 | Ueta et al. |
| 2005/0212219 A1 | 9/2005 | Langenbach et al. |
| 2005/0285352 A1 | 12/2005 | Ueta et al. |

FOREIGN PATENT DOCUMENTS

| | | |
|---|---|---|
| JP | 6-129540 | 5/1994 |
| JP | 2000230640 A * | 8/2000 |

* cited by examiner

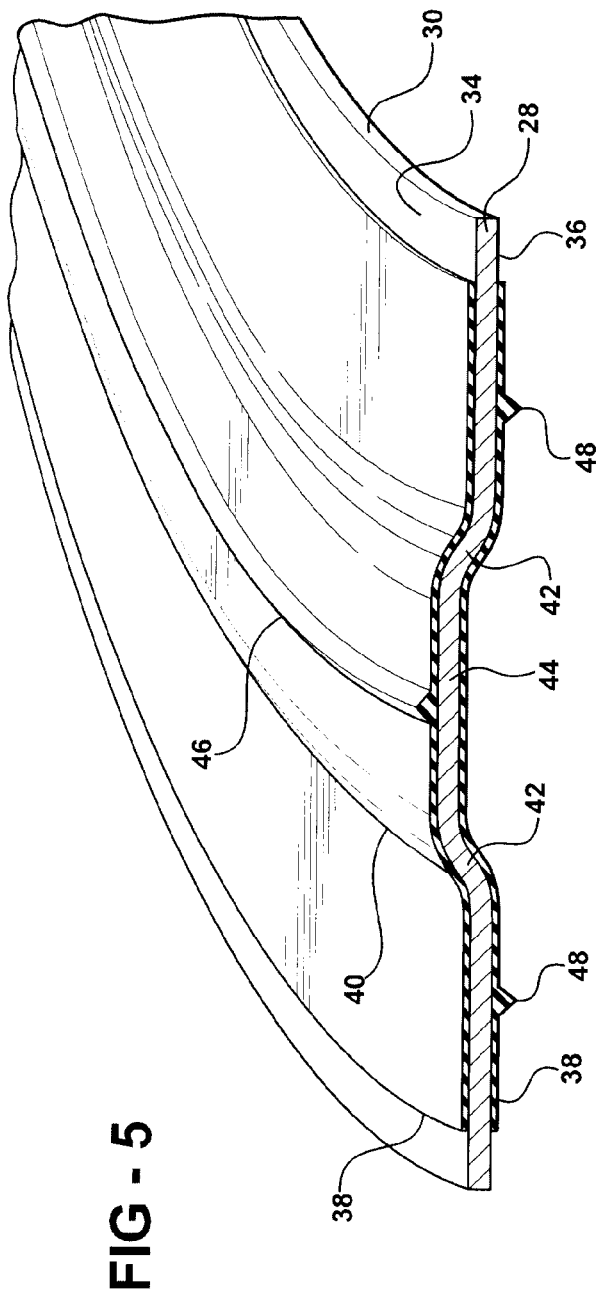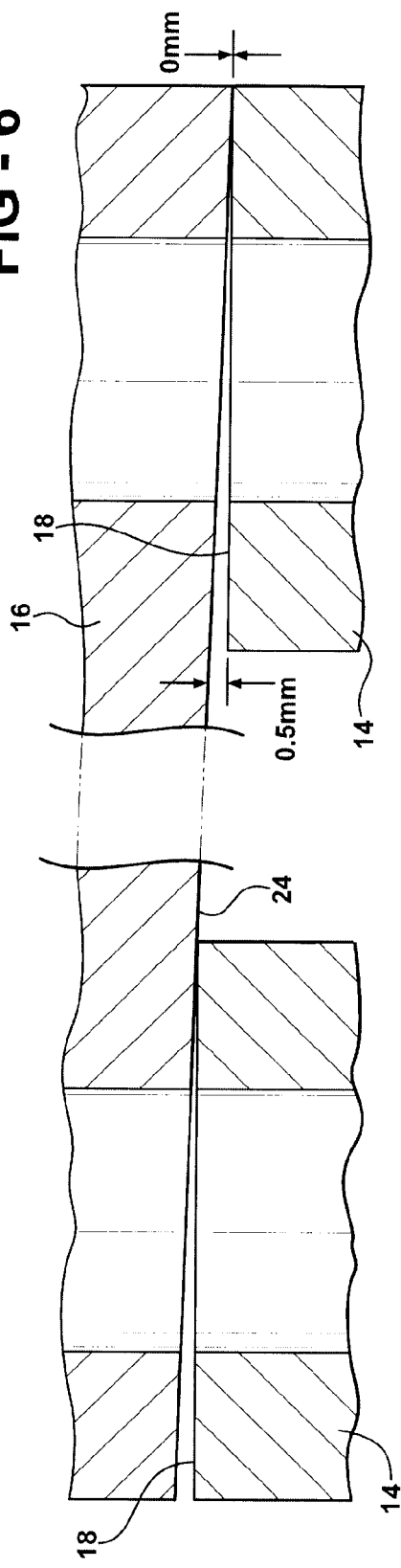

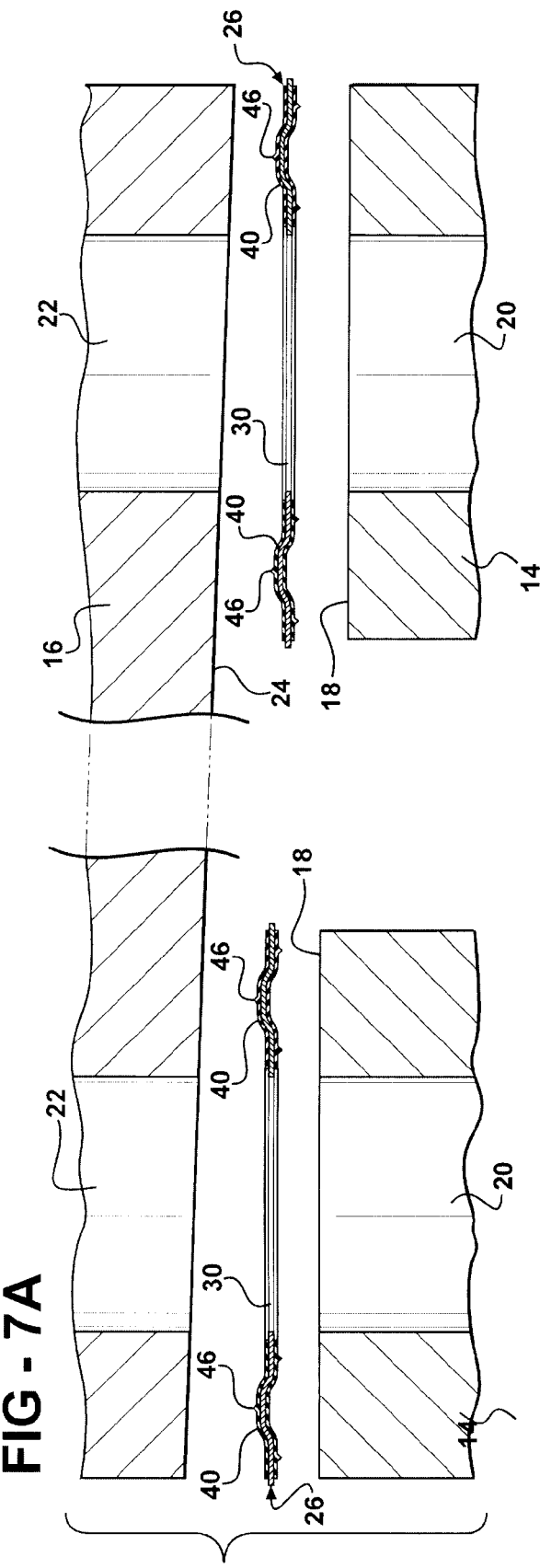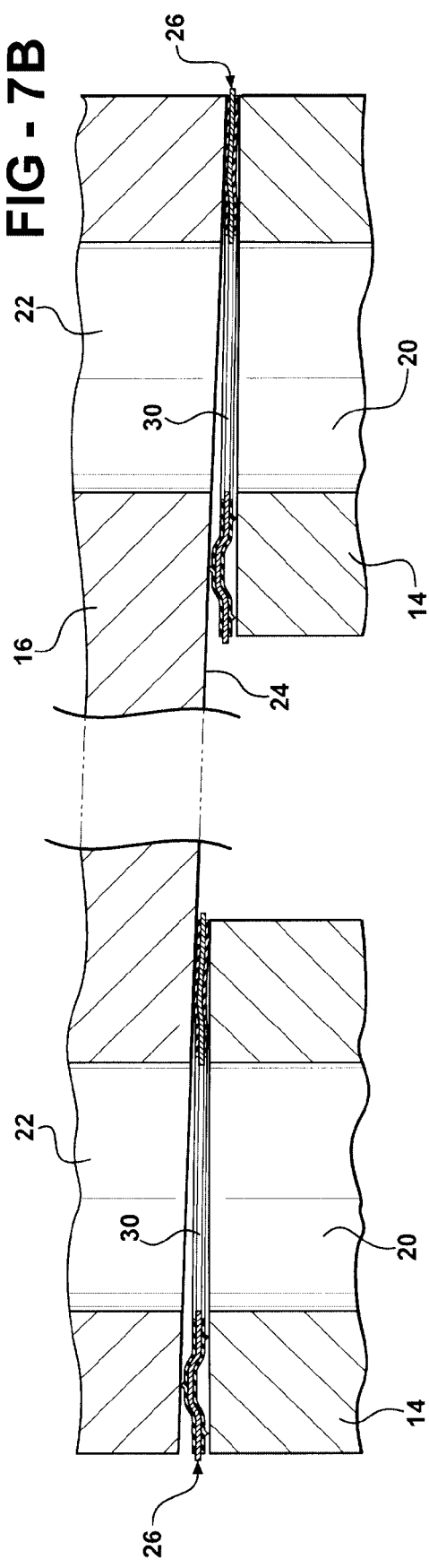

STATIC GASKET

CROSS REFERENCE TO RELATED APPLICATIONS

This application claims the benefit of priority to U.S. Provisional Patent Application No. 60/864,843 filed Nov. 8, 2006.

BACKGROUND OF THE INVENTION

1. Field of the Invention

The invention relates generally to static gaskets for use in sealing a clamped joint such as that of an intake manifold for an internal combustion V engine.

2. Related Art

So-called Liquid Elastomer Molding (LEM) gaskets are generally known, and usually consist of a metallic core, coated over selected areas on both sides with a thin layer of silicone with molded-in sealing beads. These beads have a thread-like quality and are usually formed with differing heights and widths depending on the clamping load distribution and application requirements. An example of a typical prior art LEM gasket is illustrated in FIG. 3. The base elastomer coating provides a good overall micro-seal, and the silicone beads ensure optimum sealing in critical areas. LEM gaskets can be designed with molding along an edge either for sealing of high pressure fluids or for T joints between mating flanges.

The joint between an intake manifold and the cylinder heads of an internal combustion V engine can be difficult to seal. Specialty gaskets of complex design and expensive construction are usually specified for this particular application. LEM gaskets have not heretofore been adaptable to this particular application. In particular, the intake manifold in a V engine is positioned between and bolted to upwardly facing ceiling surfaces of the cylinder head, which portions of the cylinder head comprise intake ports for air fuel mixtures received through the intake manifold. Intake manifold gaskets are installed between the sealing surfaces of the cylinder heads and the manifold and, when clamped, serve to perfect a fluid-tight seal at the joint. The general construction is illustrated in FIG. 1.

Difficulties can arise in this region when the surfaces of the cylinder heads are misaligned. Misalignment can occur as a result of stack-up tolerances from the various parts being bolted together that results in the sealing surface of one or both of the heads being out of the predetermined, ideal position. For example, an ideal position may call for the sealing surfaces of the heads to lie in a common plane, as illustrated in FIG. 1. Alternatively, in different engine designs, an ideal position may call for the sealing surfaces of the head to lie in v-shaped intersecting planes, where the intersection of the two planes falls precisely along the center-line of the engine. The intake manifold, in turn, will have sealing surfaces that rely on the cylinder heads to be properly oriented in order to provide full surface-to-surface support for the gaskets and thus achieve a fluid-tight seal. However, when the sealing surfaces are misaligned, such as indicated schematically in FIG. 6, a step is created in the otherwise aligned support surfaces for the intake manifold gasket, which misalignment leads to irregular loading of the gasket and potential difficulties in achieving an adequate seal.

The problem is made worse by the unpredictable variation in the sealing conditions that can occur in the manufacture of engines. Internal combustion engines are, of course, made by assembling hundreds of components in an assembly operation. Often, the assembly operation is performed in high-production, high through-put factories, where one engine after another is assembled along a working conveyor line. The stack-up tolerances may result in the sealing surfaces of one engine being in proper alignment, whereas the next engine on the assembly line may have one of the sealing surfaces stepped upwardly from an ideal arrangement, while the next engine after that on the assembly line may have one of the sealing surfaces stepped down from the ideal plane, and so forth. This ever-changing, unpredictable environment presents a real challenge to gaskets that rely on parallel meeting surfaces to achieve a fluid-tight seal.

U.S. Pat. No. 5,530,575 discloses a gasket having a thin metal core and elastomer sealing beads applied to each side of the core. This is an example of an LEM gasket, which is well suited to many applications and is relatively inexpensive to manufacture. Unfortunately, this type of gasket construction has difficulty sealing in applications where the two mating surfaces do not have a predictable orientation relative to one another. In other words, if the two mating surfaces can be predicted to always have a parallel planar, or consistently skewed, orientation relative to one another, the height of the sealing beads can be designed to accommodate the anticipated conditions. However, as described above, in the situation of assembling an intake manifold onto a V engine, the orientation between the mating surfaces cannot be predicted with any degree of confidence. As a result, V engine applications have not been able to take advantage of the efficient, low cost and highly desirable LEM gasket construction.

Accordingly, there is a need to adapt LEM gasket construction and methodology to applications in which the orientation of the mating sealing surfaces is not consistent or predictable.

SUMMARY OF THE INVENTION

A static gasket according to one aspect of the invention includes a flat metallic core having opposite first and second sealing surfaces adapted to be clamped between two members to be sealed and at least one opening extending through the core for the conveyance of fluid between associated fluid passages of the members. The core includes at least one deformed metal embossment surrounding the fluid conveying opening. The embossment has a convex side associated with the first sealing surface and a concave side associated with the second sealing surface. A single sealing layer of elastomeric sealing material is applied to selected areas on each of the first and second sealing surfaces of the core. The sealing layer includes at least one crown bead formed by an integral, upstanding portion of the elastomeric material. The crown bead extends continuously along the convex side of the embossment. The sealing layer further includes at least two flanking beads formed by respective integral upstanding portions of the elastomeric material. The flanking beads extend continuously along the second sealing surface directly adjacent to the concave side of the embossment in spaced, non-intersection relation to one another and with the embossment disposed there between.

According to another aspect of this invention, an internal combustion engine assembly is provided of the type comprising a pair of spaced apart cylinder heads, each cylinder head having at least one intake port. An intake manifold has at least two intake passages. Each intake passage is associated with a respective one of the cylinder heads. The intake passages and the intake ports are generally aligned with one another for the conveyance of fluid there between. A pair of gaskets is provided. Each gasket is operatively disposed between a respective one of the cylinder heads and the intake manifold. Each gasket includes a flat metallic core having opposite first and second sealing surfaces, and at least one opening extending through the core that is generally aligned with the intake passage and the intake port of the associated intake manifold and cylinder head. The core includes at least one deformed metal embossment surrounding the opening. The embossment has a convex side associated with the first sealing surface and a concave side associated with the second sealing surface. The gasket further includes a single sealing layer of elastomeric sealing material applied to selected areas on each of the first and second sealing surfaces of the core. The sealing layer includes at least one crown bead formed by an integral upstanding portion of the elastomeric material. The crown bead extends continuously along the convex side of the embossment. The sealing layer further includes at least two flanking beads formed by respective integral upstanding portions of the elastomeric material. The flanking beads extend continuously along the second sealing surface directly adjacent the concave side of the embossment in spaced, non-intersecting relation to one another and with the embossment disposed there between.

A gasket manufactured according to the subject invention is able to seal under variable support conditions such as those described above in connection with an intake manifold joint. The combination of the deformed metal embossment together with the strategically placed crown and flanking beads of elastomeric material enables the gasket to accommodate variable loading resulting from clamped surfaces that are not consistently oriented relative to each other from one part to the next. Thus, in the example of an intake manifold to cylinder head joint in a V engine, misalignment of cylinder heads can result in variable gaps at the sealing surface. The embossment will crush in regions where clamping pressures are greatest, while remaining contoured and deformed in regions of lower clamping pressure. As a result, the joint is effectively sealed using a gasket made according to the desirable LEM gasket techniques.

BRIEF DESCRIPTION OF THE DRAWINGS

These and other features and advantages of the present invention will become more readily appreciated when considered in connection with the following detailed description and appended drawings, wherein:

FIG. 1 is a simplified frontal view of a typical V engine illustrating an intake manifold exploded away from its point of connection to the respective cylinder heads, with intake manifold gaskets disposed there between;

FIG. 5 is a fragmentary cross-sectional view in perspective taken generally along lines 5-5 of FIG. 4;

FIG. 6 is a schematic view depicting the manner in which a slight misalignment between the cylinder heads of a V engine may result in uneven mating of an intake manifold, for which a gasket made according to the subject invention is adapted to accommodate the offset;

FIG. 7A is a highly simplified fragmentary cross-sectional view of a pair of cylinder heads which are misaligned as in FIG. 6 and with gaskets made according to the subject invention disposed between the cylinder heads and an intake manifold; and FIG. 7B is a view as in FIG. 7A, but showing the intake manifold clamped tightly against the cylinder head as in an operational condition, with the gasket assemblies of the subject invention compressed in a fluid-tight sealing mode.

DETAILED DESCRIPTION OF THE PREFERRED EMBODIMENT

Figure 1:
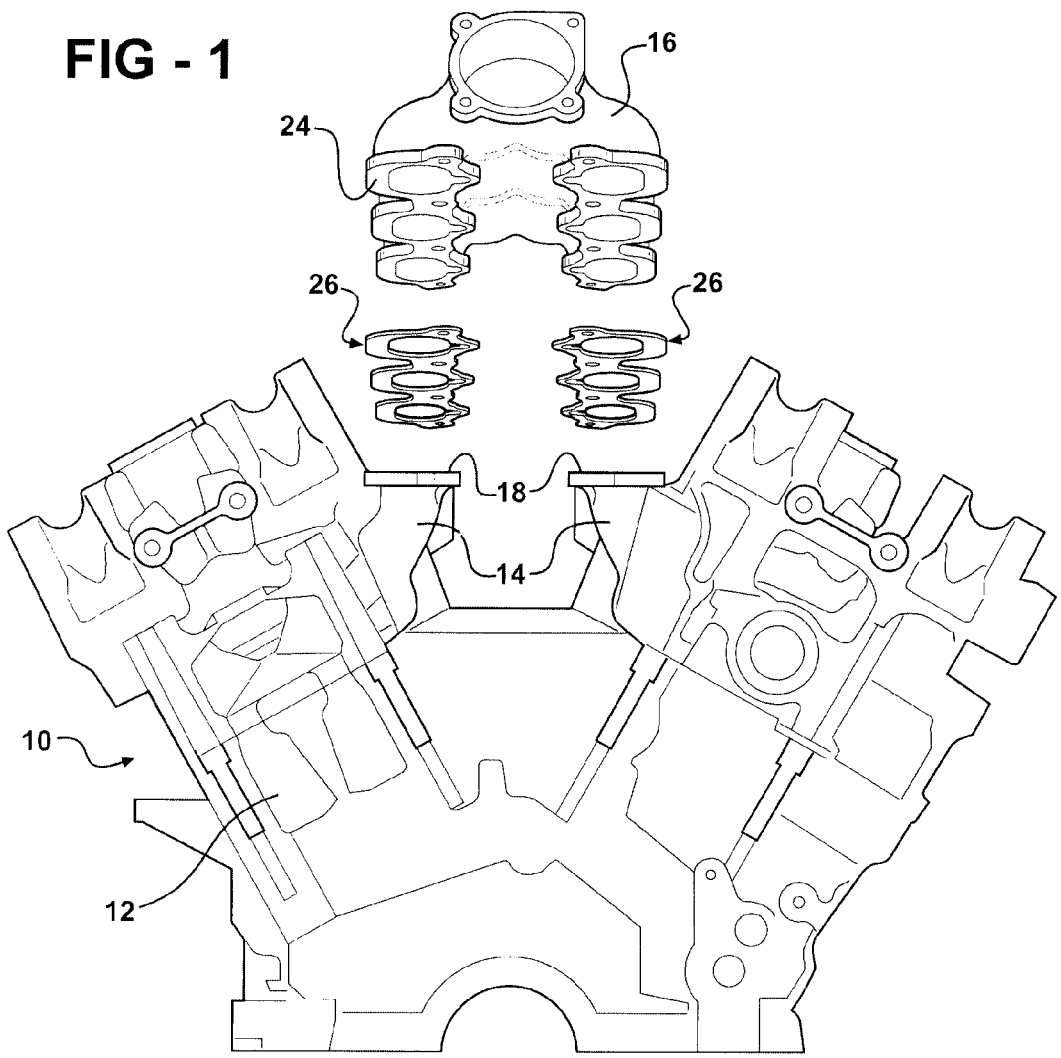
Figure 2:
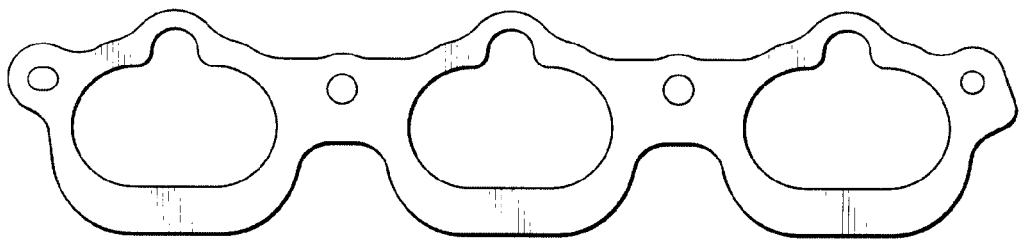
FIG. 2 is a plan view of an exemplary intake manifold gasket made according to prior art techniques.

Referring to the Figures, wherein like numerals indicate like or corresponding parts throughout the several views, an exemplary internal combustion V-block engine is generally shown at 10 in FIG. 1. The engine 10 includes an engine block 12, a pair of cylinder heads 14 and an associated intake manifold 16. The cylinder heads 14 are bolted to the engine block 12 in conventional manner. The cylinder heads 14 have upper sealing surfaces 18 which in this example are oriented in a common plane. However, in other engine applications the respective upper sealing surfaces 18 of the cylinder heads 14 may be angled in a V-like pattern.

Each cylinder head 14 includes at least one, but more commonly a plurality, of intake ports 20 which are perhaps best illustrated in FIGS. 7A-B. In a V-6 engine configuration, for example, each cylinder head 14 will include three intake ports 20, although there is not always a 1:1 relationship between the number of cylinders and the number of intake ports 20. The intake ports 20 are typically arranged in line in the longitudinal, or lengthwise, direction of the cylinder heads 14.

The intake manifold 16 extends across the valley between the cylinder heads 14 and is bolted to the cylinder heads 14 in the usual manner. The intake manifold 16 as a plurality of associated intake passages 22 is perhaps best shown in FIG. 7A-B. The intake passages 22 communicate with the intake ports 20 of the cylinder heads 14 across a planar (or V-shaped) sealing surface 24 of the intake manifold 16.

Intake manifold gaskets, generally indicated at 26, are positioned between the sealing surfaces 18, 24 of the cylinder heads 14 and intake manifold 16 to provide a fluid-tight seal of the intake ports 20 and passages 22 at their common joint.

Ideally, the sealing surfaces 18 of the cylinder heads 14 are to be arranged in a predetermined position relative to one another to correspond to a fixed position of the sealing surface 24 of the intake manifold 16 in order to provide a proper mating or nesting between the sealing surface 24 of the intake manifold 16 and the sealing surfaces 18 of the cylinder heads 14. When the surfaces 18, 24 are properly aligned in parallel relationship with one another, the gaskets 26 are able to be uniformly compressed and a good seal is achieved at the joint. Problems can arise, however, when the sealing surfaces 18 of the cylinder heads 14 are misaligned, as depicted schematically in FIG. 6. This can occur, for example, as a result of the stack-up tolerances from the various components being machined and bolted together. Conditions that are known to exist are where the sealing surface 18 of one of the cylinder heads 14 is positioned above or below the sealing surface 18 of the other cylinder head 14, when the two are arranged in co-planar relation as depicted in FIG. 6. Similar misalignments can occur when the sealing surfaces 18 are configured in a V-pattern. Thus, as illustrated in FIG. 6, this condition moves the sealing surfaces 18 out of their ideal relationship and has the effect of introducing a step or offset into the combined sealing surfaces 18 of the cylinder heads 14 such that the associated sealing surface 24 of the intake manifold 16 no longer fits properly and there are variable thickness gaps introduced into the joint. As illustrated in FIG. 6, this gap may equal 0.5 mm or less on one side of the sealing surface 18 yet taper to zero on the other side of the sealing surface 18.

This can present a challenge to achieving a proper seal when using conventional intake manifold gaskets. Further difficulties arise in trying to address the problem in that the precise relationship between the sealing surfaces 18 are not consistent from one engine to the next in a high through-put, sequential assembly operation. For example, in one engine 10m the right cylinder head 14 may be bolted into position higher than the left cylinder head 14, whereas in the very next engine 10 on the assembly line, the right cylinder head 14 may be lower than the left, and in still the next engine 10, the cylinder heads 14 may be properly positioned with their sealing surfaces 18 aligned.

Figure 3:
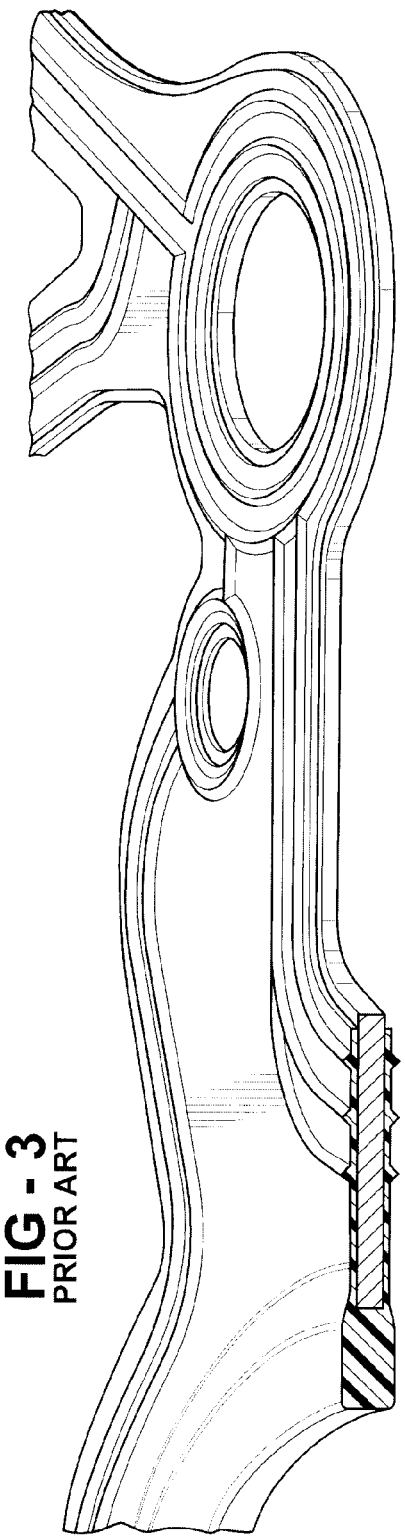
FIG. 3 is a fragmentary perspective view of a typical prior art intake manifold gasket.

The static gasket assembly 26 according to the subject invention is designed to accommodate such irregularities in the respective positions of the sealing surfaces 18, 24, and can seal equally well whether the surfaces 18 are aligned or misaligned. A preferred embodiment of the gasket assembly 26 is illustrated in FIGS. 4, 5, and 7A-B. Most advantageously, the subject gasket assembly 26 is manufactured according to the known LEM gasket techniques, such as described and shown in the applicant's prior U.S. Pat. No. 6,530,575 to poquet et al., granted Mar. 11, 2003, the entire disclosure of which is hereby incorporated by reference. FIG. 3 illustrates a prior art LEM gasket.

Figure 4:
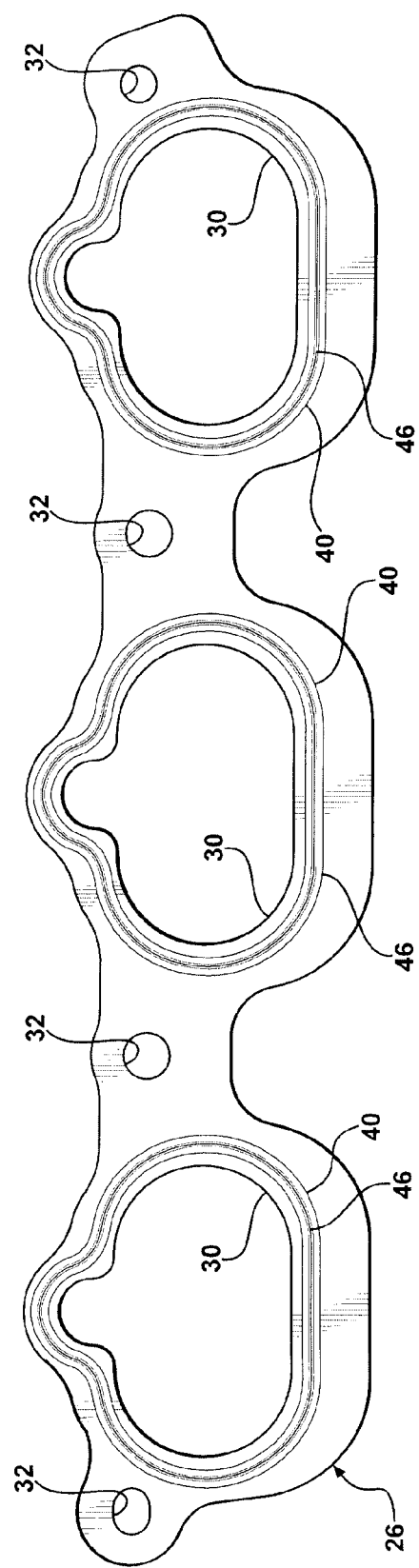
FIG. 4 is a plan view of a gasket assembly made according to the subject invention.

As perhaps best shown by reference to FIGS. 4 and 5, the gasket assembly 26 includes a metal gasket core 28 which may be fabricated from a soft galvanized steel or aluminum composition. Other material compositions may also be used for the core 28 without departing from the spirit of this invention. The core 28 may have a thickness of about 0.2-1.5 mm. The core 28 is formed with at least one opening 30 for the conveyance of fluids through the gasket 26. In the case of the gasket 26 suitable for use as an intake manifold gasket in a V-6 engine, the core 28 would include three such fluid openings 30 corresponding to the three intake ports 20 in each cylinder head 14. It will be understood that there is a gasket 26 for each cylinder head 14, and that the specific number of openings 30 may vary from one engine application to the next. The core 28 may further have additional holes 32 for accommodating fasteners (not shown) used to mount the manifold 16 to the cylinder heads 14. The fastener holes 32 are spaced from the openings 30.

As perhaps best illustrated in FIG. 5, the core 28 presents opposite first 34 and second 36 sealing surfaces. The sealing surfaces 34, 36 may be entirely or substantially covered with a single thin layer 38 of polymeric sealing material. The material of the sealing layer 38 may comprise any of a number of materials suitable for sealing applications, including but not limited to silicone and derivatives thereof. The sealing layer 38 may be very thin, such that the thickness is between 0 and 0.5 mm. in the areas where it is present.

The core 28 may comprise a single layer of metal and include at least one deformed metal embossment 40 surrounding at least one of the openings 30. Preferably, however, all of the openings 30 will be surrounded by their own embossment 40. As depicted in FIG. 5, the embossment 40 has a ridge-like construction formed by inwardly angling side walls 42 and a plateaued crest portion 44.

The sealing layer 38 extends over the embossment 40 and most preferably has a thickness that is about half the thickness or less than that of the core 28. Thus, in the preferred embodiment, the core 28 has a thickness that is at least twice as thick as that of the sealing layer 38, although this dimensional relationship may be violated in certain applications without departing from the spirit of this invention. The sealing layer 38 is formed with at least one crowned sealing bead 46 formed as an integral, upstanding portion of the elastomeric material. The crown bead 46 extends continuously along the convex side of the embossment 40. In other words, and as depicted in FIG. 5, the embossment 40 is offset upwardly relative to the first sealing surface 34 of the core 28, and forms thereby an upstanding, convex formation. Conversely, the configuration of the embossment 40 relative to the second sealing surface 36 depicts a convex side which, when viewed from that direction, has the appearance of a trough or channel. The crown bead 46 is positioned on top of, i.e., above the crest portion 44, of the embossment 44. The crown bead 46 extends along the embossment 40 over all or only a portion of its length, however in the preferred embodiment, the embossment 40 and crown bead 46 are collinear. The crown bead 46 may have a uniform height and width, or one or both dimensions may vary along its length. As depicted in the drawing figures, the crown bead 46 may have a generally triangular cross-sectional shape with a height ranging from 0.05-0.4 mm. Other shapes of course are possible. The crown bead 46 preferably has a height that is equal to or greater than the thickness of the sealing layer 38; however, this is not an inviolate dimensional relationship.

Furthermore, the sealing layer 38 is formed so as to include at least two flanking beads 48 formed by respective integral, upstanding portions of the elastomeric material. The flanking beads 48 extend continuously along the second sealing surface 36 directly adjacent the concave side of the embossment 40 in spaced, non-intersecting relation to one another so that the embossment 40 is disposed between them. The flanking beads 48 may be formed to have cross sectional shapes and dimensions which are substantially equivalent to that of the crown bead 46, or they may have distinct shapes and dimensions.

Referring now to FIGS. 7A and 7B, a pair of the subject gaskets 26 are shown in an operational condition being clamped between respective cylinder heads 14 and the intake manifold 16 in the presence of variable width gaps resulting from misaligned cylinder heads 14. As shown in FIG. 7B, the embossment 40 is caused to compress and form a suitable seal in those regions where the width of the gap is the smallest. In areas where the gap is largest, the crown 46 and flanking 48 beads serve to engage the opposite sealing surfaces 18, 24 of the cylinder heads 14 and intake manifold 16 to close the gap and perfect a fluid-tight seal. Thus, in the regions where the gap is small, the embossment 40 collapses and the beads 46, 48, together with the functionality of the sealing layer 38, provide a seal. In the regions where the gap is wide, the embossment 40 remains undisturbed, or only minimally disturbed, and the beads 46, 48 establish the necessary seal, perhaps with only minimal assist from the surrounding sealing layer 38. In this way, the gasket 26 is able to be made with an embossment 40 that is smaller in height than the expected maximum gap required, and the difference made up through the provision of the crown 46 and flanking 48 beads. The beads 46, 48 also serve to seal in cases where the sealing gap is uniformly zero or close to zero. In this situation, the embossment 40 is fully compressed in all locations, and the beads 46, 48 seal as if the core were entirely flat (i.e., without the upset configuration of the embossment 40). Thus, the combination of the embossment 40 and the elastomeric beads 46, 48 work together to seal under inconsistently variable conditions, such as that described above in regard to misaligned cylinder heads 14 in high through-put assembly line operations.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A static gasket comprising:
a flat metallic core having opposite first and second sealing surfaces adapted to be clamped between two members to be sealed and at least one opening extending through said core for the conveyance of a fluid between associated fluid passages of the members;
said core including at least one deformed metal embossment surrounding said fluid conveying opening, said embossment having a convex surface defining a convex side associated with said first sealing surface and a concave surface defining a concave side associated with said second sealing surface;
a single sealing layer of elastomeric sealing material applied with a generally uniform thickness to selected areas on each of said first and second sealing surfaces of said core including said convex and concave sides of said embossment;
said sealing layer including at least one crown bead formed by an integral, upstanding portion of said elastomeric material, said crown bead located on the convex surface and extending continuously along the at least one opening; and
said sealing layer further including at least two flanking beads formed by respective integral, upstanding portions of said elastomeric material, said flanking beads extending continuously along said second sealing surface of said core directly adjacent spaced laterally to either side of said concave surface of said embossment in spaced, non-intersecting relation to one another and with said concave surface of said embossment disposed therebetween.

2. The gasket of claim 1 wherein said sealing layer of elastomeric sealing material has a thickness, and said crown bead has a height that is equal to or greater than said elastomeric sealing material thickness.

3. The gasket of claim 1 wherein said sealing layer of elastomeric sealing material has a thickness, and said flanking beads have a height that is equal to or greater than said elastomeric sealing material thickness.

4. The gasket of claim 1 wherein said sealing layer of elastomeric sealing material has a thickness, and said core has a thickness that is at least twice as thick as said elastomeric sealing material thickness.

5. The gasket of claim 1 wherein, when viewed in transverse cross-section, said embossment has angled side walls and a plateaued crest portion.

6. The gasket of claim 1 wherein, when viewed in transverse cross-section, said crown bead has a generally triangular configuration.

7. The gasket of claim 1 wherein, when viewed in transverse cross-section, said flanking beads each have a generally triangular configuration.

8. The gasket of claim 1 wherein said elastomeric material is fabricated from a silicone-based composition.

9. An internal combustion engine assembly comprising:
a pair of spaced apart cylinder heads, each said cylinder head having at least one intake port; an intake manifold having at least two intake passages, each of said intake passages associated with respective ones of said cylinder heads, said intake passages and said intake ports being generally aligned with one another for the conveyance of fluid therebetween;
a pair of gaskets, each said gasket operatively disposed between a respective one of said cylinder heads and said intake manifold, each said gasket including a flat metallic core having opposite first and second sealing surfaces and at least one opening extending through said core that is generally aligned with said intake passage and said intake port of said associated intake manifold and cylinder head, said core including at least one deformed metal embossment surrounding said opening, said embossment having a convex surface defining a convex side associated with said first sealing surface and a concave surface defining a concave side associated with said second sealing surface;
said gasket further including a single sealing layer of elastomeric sealing material applied with a generally uniform thickness to selected areas on each of said first and second sealing surfaces of said core including said convex and concave sides of said embossment;
said sealing layer including at least one crown bead formed by an integral, upstanding portion of said elastomeric material, said crown bead located on the convex surface and extending continuously along the at least one opening; and
said sealing layer further including at least two flanking beads formed by respective integral, upstanding portions of said elastomeric material, said flanking beads extending continuously along said second sealing surface of said core directly adjacent spaced laterally to either side of said concave surface of said embossment in spaced, non-intersecting relation to one another and with said concave surface of said embossment disposed therebetween.

10. The gasket of claim 9 wherein said sealing layer of elastomeric sealing material has a thickness, and said crown bead has a height that is equal to or greater than said elastomeric sealing material thickness.

11. The gasket of claim 9 wherein said sealing layer of elastomeric sealing material has a thickness, and said flanking beads have a height that is equal to or greater than said elastomeric sealing material thickness.

12. The gasket of claim 9 wherein said sealing layer of elastomeric sealing material has a thickness, and said core has a thickness that is at least twice as thick as said elastomeric sealing material thickness.

13. The gasket of claim 9 wherein, when viewed in transverse cross-section, said embossment has angled side walls and a plateaued crest portion.

14. The gasket of claim 9 wherein, when viewed in transverse cross-section, said crown bead has a generally triangular configuration.

15. The gasket of claim 9 wherein, when viewed in transverse cross-section, said flanking beads each have a generally triangular configuration.

16. The gasket of claim 9 wherein said elastomeric material is fabricated from a silicone-based composition.

* * * * *